United States Patent
Overman et al.

(10) Patent No.: US 9,323,884 B2
(45) Date of Patent: *Apr. 26, 2016

(54) COMPUTER PROGRAM, METHOD, AND SYSTEM FOR LOCKSMITHING

(71) Applicant: Vinlocks LLC, Olathe, KS (US)

(72) Inventors: John Overman, Tacoma, WA (US); Joey Hendrich, Olathe, KS (US)

(73) Assignee: Vinlocks LLC, Olathe, KS (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/760,813

(22) Filed: Feb. 6, 2013

(65) Prior Publication Data
US 2013/0204423 A1 Aug. 8, 2013

Related U.S. Application Data

(60) Provisional application No. 61/596,011, filed on Feb. 7, 2012.

(51) Int. Cl.
*G06F 15/00* (2006.01)
*G06F 17/50* (2006.01)
*H04L 9/08* (2006.01)
*G05B 15/02* (2006.01)

(52) U.S. Cl.
CPC ............. *G06F 17/5086* (2013.01); *G05B 15/02* (2013.01); *G06F 15/00* (2013.01); *H04L 9/0822* (2013.01); *H04L 9/0866* (2013.01); *H04L 2209/84* (2013.01)

(58) Field of Classification Search
CPC ...................................................... G06F 15/00
USPC ................................... 700/117, 292; 409/82
See application file for complete search history.

(56) References Cited

U.S. PATENT DOCUMENTS

2011/0262240 A1* 10/2011 Mutch et al. .................... 409/82

* cited by examiner

*Primary Examiner* — Tejal Gami
(74) *Attorney, Agent, or Firm* — Hovey Williams LLP (57) ABSTRACT

A computer program, method, and system for locksmithing. The computer program, method, and system receive vehicle information, obtain a key code for a lock based on the vehicle information, decrypt the key code to determine key specification data, and provide the key specification data to a user, such that a duplicate key corresponding to the lock can be formed.

1 Claim, 3 Drawing Sheets

COMPUTER PROGRAM, METHOD, AND SYSTEM FOR LOCKSMITHING

RELATED APPLICATIONS

This non-provisional patent application claims priority benefit, with regard to all common subject matter, of earlier-filed U.S. Provisional Patent Application No. 61/596,011, filed Feb. 7, 2012, and entitled "COMPUTER PROGRAM, METHOD, AND SYSTEM FOR LOCKSMITHING." The identified earlier-filed provisional patent application is hereby incorporated by reference in its entirety into the present non-provisional application.

FIELD

Embodiments of the present invention provide a computer program, method, and system for locksmithing. In more detail, embodiments of the present invention are directed to a computer program, method, and system for receiving vehicle information, obtaining a key code based on the vehicle information, decrypting the key code to determine key specification data for the lock, and providing the key specification data to a user, such that a duplicate key for the lock can be formed.

BACKGROUND

Keys for use with mechanical-type locks are generally associated with unique key codes that correspond to the shape and/or the cut of the keys. Automotive car keys are similarly associated with unique key codes that define the shape and/or the cut of the keys. Further, the key codes provide for locksmiths or automotive diagnostic/repair technicians to duplicate keys based solely on the information embedded in the key codes. The key code for a particular vehicle is generally included with the purchase paperwork of any new or used vehicle. If the key code is lost or otherwise unavailable, it can generally only be recovered by contacting a vehicle manufacturer or the original dealer. In certain instances, a locksmith may use a vehicle identification number (VIN) of a particular vehicle to determine its key code. As described in more detail below, the VIN of a particular vehicle is generally associated with the vehicle's key code, such that knowing the VIN may allow the locksmith to determine the key code. Upon determining the key code, the locksmith can obtain information from the key code that permits the locksmith to duplicate the key for the particular vehicle.

To duplicate a key, a locksmith generally uses a key forming device that can create a duplicate key from specific information the locksmith enters or uploads to the key forming device. Key forming devices generally include a plurality of inputs, mechanical or electrical, which may be manipulated by the locksmith to form the duplicate key. Alternatively, the specific information for forming the duplicate key can be uploaded to a processor and/or memory element of the key forming device via an associated communications network. Because the key code may include the specific information necessary to duplicate a key, the locksmith may use the key code to obtain the specific information and may then input the specific information into the key forming device to form the duplicate key.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

Embodiments of the present invention include a method and computer program for obtaining a key code for a lock, decrypting the key code to determine key specification data for the lock, and providing the key specification data to a user, such that a key can be formed according to the key specification data. The method and computer program may include an initial step of receiving lock information from a user. Upon receiving the lock information from the user, embodiments of the present invention may connect to a key code provider and obtain a key code from the key code provider. Such an obtained key code may correspond to the lock information received from the user. After receiving the key code, embodiments of the present invention provide for the key code to be decrypted, so as to obtain key specification data. The key specification data can be presented to the user and may additionally be sent to a key forming device for duplicating a key according to the key specification data.

Embodiments of the present invention may further include a system for obtaining a key code for a lock; decrypting the key code to determine key specification data for the lock; and providing the key specification data to a user, such that a key can be manufactured according to the key specification data. The system may comprise a key forming device and a computer having a user interface and computer program stored thereon. The computer program may instruct the computer to perform an initial step of receiving lock information from a user. Upon receiving the lock information from the user, embodiments of the present invention may connect to a key code provider and obtain a key code from the key code provider. Such an obtained key code may correspond to the lock information received from the user. After receiving the key code, embodiments of the present invention may provide for the key code to be decrypted, so as to obtain key specification data. The key specification data can be presented to the user. In addition, the key specification data can be transmitted to the key forming device, where a duplicate key can be formed according to the key specification data obtained from the key code.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figures 1, 2:
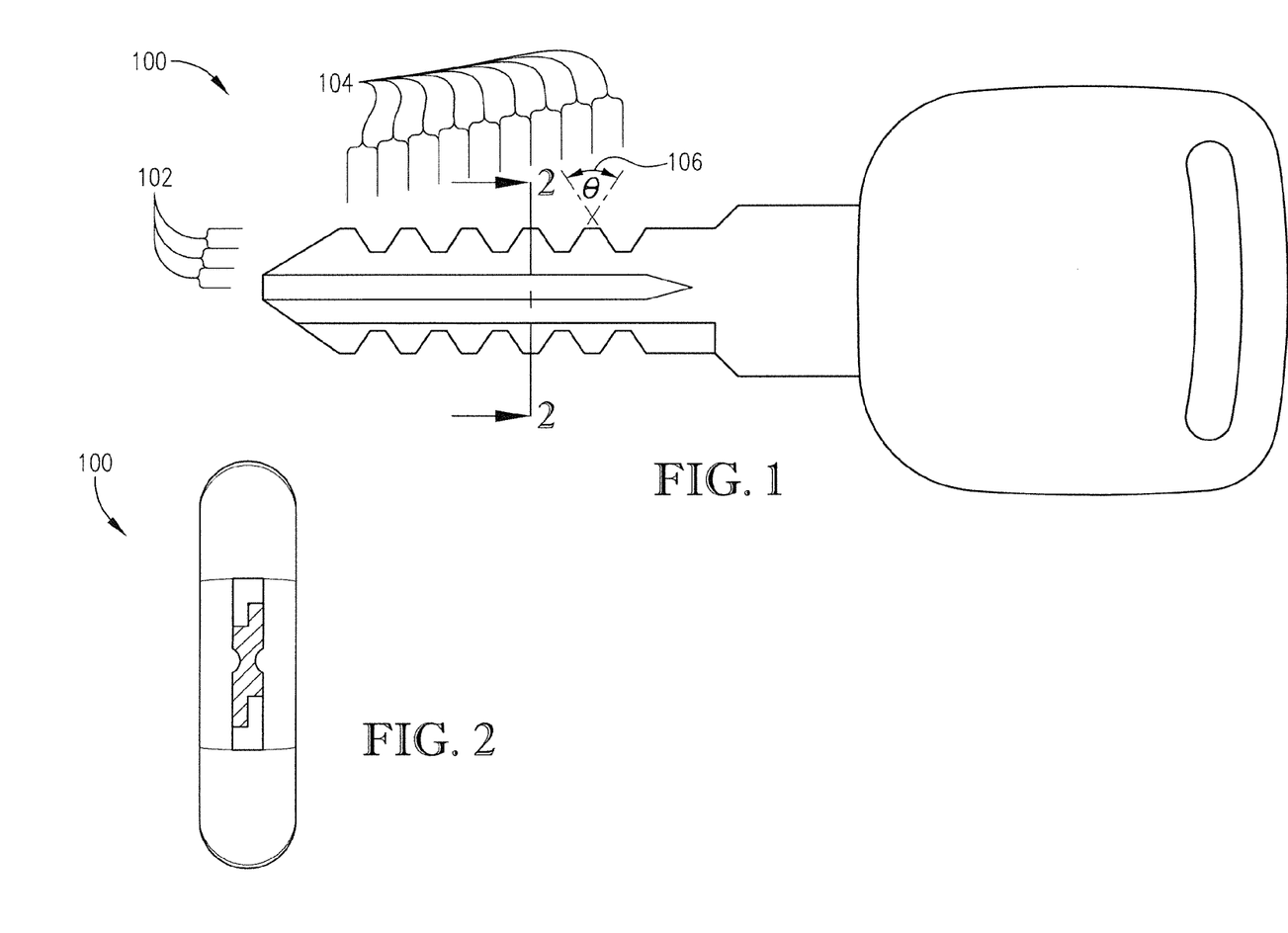
FIG. 1 is a perspective view of an exemplary key formed in accordance with embodiments of the present invention.
FIG. 2 is a cross section view of the key from FIG. 1 taken along the line 2-2 of FIG. 1.

The present invention provides various embodiments of a computer program, a method, and a system for obtaining key codes, such as blind key codes and electronic security codes for manufacturing and programming keys to fit and operate a vehicle lock. A blind key code is an alphanumeric string of digits (i.e., numbers and/or letters) that generally cannot be independently used to duplicate and/or manufacture a key. To manufacture a key from a blind key code, an individual, such as locksmith or an automotive diagnostic/repair technician, must either (1) have access to a computer program that can decrypt the blind key code, or (2) must otherwise have access to a cross-referencing list of bitting key codes from which the locksmith can match the blind key code with a bitting key code. As with blind key codes, bitting key codes are alphanumeric strings of digits and/or letters; however, the alphanumeric string of a bitting key code represents actual mechanical key specifications for manufacturing keys. Such mechanical key specifications may include, as illustrated by exemplary key 100 in FIG. 1, key cut depths 102, key cut spacings 104, and key cut angles 106, which are each necessary for manufacturing a key from a key blank. In addition, the mechanical key specifications may include and/or indicate a type of key blank that is associated with the respective blind key code and/or bitting code. A key blank is an uncut key that has a specified cross-section profile, such as is illustrated by the cross-section profile of key 100 as shown in FIG. 2. The mechanical key specifications obtained from the blind key code and/or the bitting key code will generally include information indicating from which type of key blank and/or cross-section profile the key should be cut. Thus, as will be described in more detail below, embodiments of the present invention may be implemented by a locksmith or an automotive diagnostic/repair technician to obtain key codes, to decrypt or cross-reference the key codes to obtain bitting key codes and/or mechanical key specifications, and to manufacture a duplicate key from the bitting key codes and/or mechanical key specifications.

In addition to mechanical key specifications, many current vehicle locks include electronic security controls that require keys be programmed with specified electronic security codes. Thus, embodiments of the present invention may additionally provide for a computer program, a method, and a system for obtaining electronic security codes for programming keys to operate a vehicle lock. For instance, a vehicle's electronic security controls may require that a key embedded with an electronic identification device, such as an electronic computer chip, resistor, or memory element, be programmed with an electronic security code, such that the electronic identification device is capable of communicating with and being verified by electronic components of the vehicle. Such electronic components may for instance be a body control module (BCM), electronic control unit (ECU), or the like. If the key's electronic identification device successfully communicates with the vehicle's electronic components and the components verify the key's electronic security code, then the key will be permitted to start and operate the vehicle. If the key's electronic identification device cannot communicate with the vehicle's electronic components or the electronic components cannot verify the electronic security code of the key, then the key will not be permitted to start or operate the vehicle. In addition, failure to establish a valid communications link or verification between the electronic components and the key's identification device may initiate security measures, such as "locking-out" or "shutting-down" the vehicle. As with the blind key codes, embodiments of the present invention provide for locksmiths and/or automotive technician/repairmen to obtain electronic security codes; to decrypt the electronic security codes (if necessary); and to program a duplicate key with the electronic key code so that the duplicate key can communicate with the vehicle's electronic components and operate the vehicle.

Figure 3:
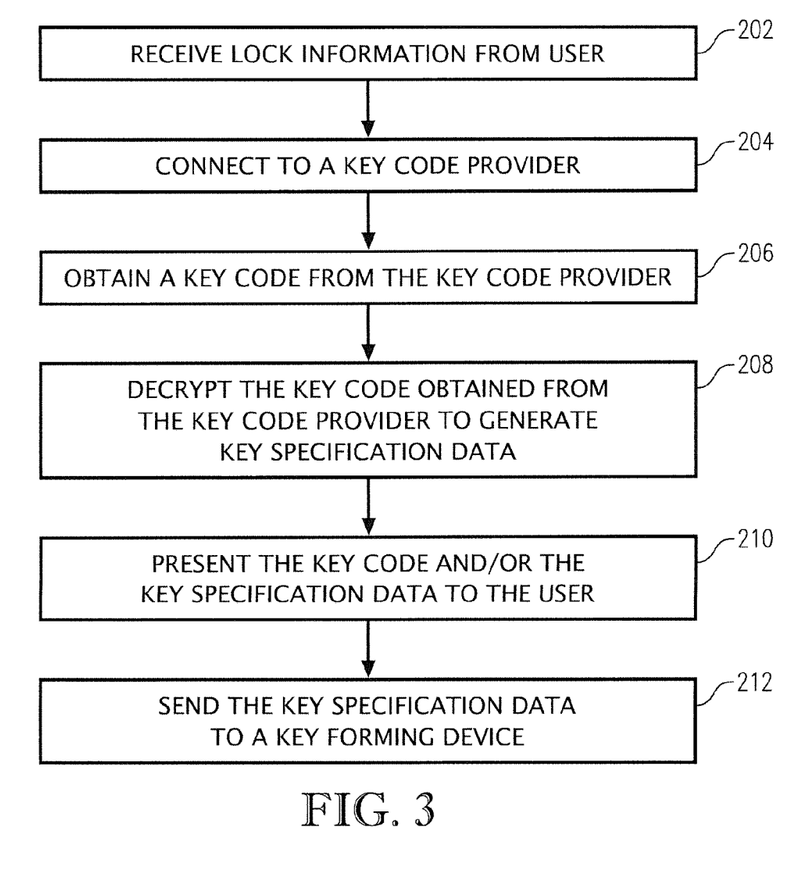
FIG. 3 is a flow chart of a method for obtaining and distributing key codes according to embodiments of the present invention.

As illustrated in FIG. 3, embodiments of the present invention may include a method with an initial Step 202 of receiving lock information from a user. Upon receiving the lock information from the user, embodiments of the present invention may, in Step 204, connect to a key code provider. In Step 206, a key code corresponding to the lock information received from the user may be obtained from the key code provider. After obtaining the key code, embodiments of the present invention provide, in Step 208, for the key code to be decrypted, so as to obtain key specification data. The key code and/or the key specification data can be presented to the user, in Step 210. Finally, in Step 212, the key specification data can be sent to a key forming device to form a duplicate key according to the key specification data. Thus, embodiments of the present invention provide for a key code to be obtained; for the key code to be decrypted; for key specification data to be obtained from the decrypted key code; and for the key specification data to be provided to a user, such that a key can be manufactured according to the key specification data.

The computer program of embodiments of the present invention comprises a plurality of code segments executable by a computing device for performing the steps of the method of the present invention. The steps of the method may be performed in the order shown in FIG. 3, or they may be performed in a different order. Furthermore, some steps may be performed concurrently as opposed to sequentially. Also, some steps may be optional.

System Description

Figure 4:
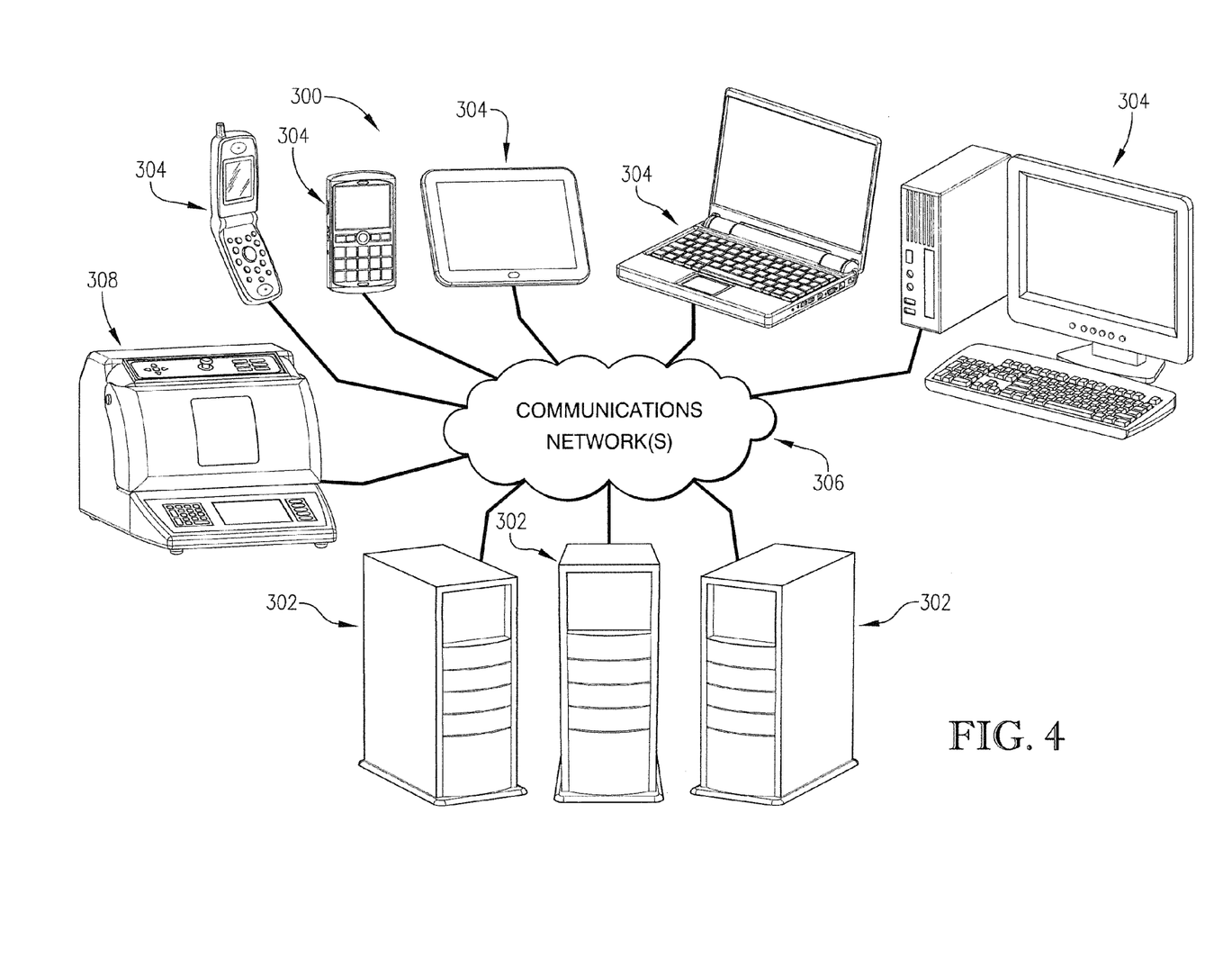
FIG. 4 is a schematic depiction of a system for obtaining and distributing key codes in accordance with embodiments of the present invention.

The computer program, system, and method of embodiments of the present invention may be implemented in hardware, software, firmware, or combinations thereof using the key code system 300, shown in FIG. 4, which broadly comprises server devices 302, computing devices 304, a communications network 306, and a key forming device 308. The server devices 302 may include computing devices that provide access to one or more general computing resources, such as Internet services, electronic mail services, data transfer services, and the like. The server devices 302 may also provide access to a locksmithing database that stores locksmithing information, which includes information related to key codes, electronic security codes, and vehicle information corresponding to each of the codes stored in the database, each of which will be described in more detail below. The locksmithing database may also store other information and data necessary for the implementation of the computer program, method, and embodiments of the present invention.

The server devices 302 and computing devices 304 may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, the server devices 302 may further include file stores comprising a plurality of hard disk drives, network attached storage, or a separate storage network.

The computing devices 304 may specifically include mobile communication devices (including wireless devices), work stations, desktop computers, laptop computers, palmtop computers, tablet computers, portable digital assistants (PDA), smart phones, and the like, or combinations thereof. Various embodiments of the computing device 304 may also include voice communication devices, such as cell phones or landline phones. In preferred embodiments, the computing device 304 will have an electronic display, such as a cathode ray tube, liquid crystal display, plasma, or touch screen that is operable to display visual graphics, images, text, etc. In certain embodiments, the computer program of the present invention facilitates interaction and communication through a graphical user interface (GUI) that is displayed via the electronic display. The GUI enables the user to interact with the electronic display by touching or pointing at display areas to provide information to the user control interface, which is discussed in more detail below. In additional preferred embodiments, the computing device 304 may include an optical device such as a digital camera, video camera, optical scanner, or the like, such that the computing device can capture, store, and transmit digital images and/or videos.

The computing devices 304 may include a user control interface that enables one or more users to share information and commands with the computing devices or server devices 302. The user interface may facilitate interaction through the GUI described above or may additionally comprise one or more functionable inputs such as buttons, keyboard, switches, scrolls wheels, voice recognition elements such as a microphone, pointing devices such as mice, touchpads, tracking balls, styluses. The user control interface may also include a speaker for providing audible instructions and feedback. Further, the user control interface may comprise wired or wireless data transfer elements, such as a communication component, removable memory, data transceivers, and/or transmitters, to enable the user and/or other computing devices to remotely interface with the computing device 304.

The communications network 306 may be wired or wireless and may include servers, routers, switches, wireless receivers and transmitters, and the like, as well as electrically conductive cables or optical cables. The communications network 306 may also include local, metro, or wide area networks, as well as the Internet, or other cloud networks. Furthermore, the communications network 306 may include cellular or mobile phone networks, as well as landline phone networks, public switched telephone networks, fiber optic networks, or the like.

Both the server devices 302 and the computing devices 304 may be connected to the communications network 306. Server devices 302 may communicate with other server devices 302 or computing devices 304 through the communications network 306. Likewise, computing devices 304 may communicate with other computing devices 304 or server devices 302 through the communications network 306. The connection to the communications network 306 may be wired or wireless. Thus, the server devices 302 and the computing devices 304 may include the appropriate components to establish a wired or a wireless connection.

The key forming device 308 may be any type of key forming device used to cut and/or program keys. For instance, the key forming device may be a key cutting device that physically cuts blank keys in response to supplied mechanical key specifications, such as the key cut depths 102, key cut spacings 104, and key cut angles 106, as illustrated in FIG. 1. The key forming device may additionally be a key programming device that functions to program a key's electronic identification device with a particular electronic security code. Additionally, the key forming device may be a combination key cutting and key programming device. The key forming device 308 may include a plurality of mechanical and/or electrical inputs from which the key forming device may receive instructions on how to cut or program a key. Such inputs may be mechanical, such as dials, buttons, knobs or the like. Additionally, the inputs to the key forming device may be electrical, such as wired or wireless. For electrical inputs, the key forming device 308 may receive key codes, mechanical key specifications, and/or electrical security codes, from which the key forming device can manufacture or program a duplicated key.

The computer program of the present invention may run on computing devices 304 or, alternatively, may run on one or more server devices 302. Additionally, a first portion of the program, code, or instructions may execute on a first server device 302 or a first computing device 304, while a second portion of the program, code, or instructions may execute on a second server device 302 or a second computing device 304. In some embodiments, other portions of the program, code, or instructions may execute on other server devices 302 as well. For example, locksmithing information may be stored on a memory element associated with the server device 302, such that the locksmithing information is remotely accessible to users of the computer program via one or more computing devices 304. Alternatively, the locksmithing information may be directly stored on the memory element associated with the one or more computing devices 304 of the user. In additional embodiments of the present invention, a portion of the locksmithing information may be stored on the server device 302, while another portion may be stored on the one or more computing devices 304. The various actions and calculations described herein as being performed by or using the computer program may actually be performed by one or more computers, processors, or other computational devices, such as the computing devices 304 and/or server devices 302, independently or cooperatively executing portions of the computer program.

In certain embodiments of the present invention, the computer program may be embodied in a stand-alone program downloaded on a user's computing device 304 or in a web-accessible program that is accessible by the user's computing device 304 via the network 306. For the stand-alone program, a downloadable version of the computer program may be stored, at least in part, on the server device 302. A user may download at least a portion of the computer program onto the computing device 304 via the network 306. In such embodiments of the present invention, the computer program may be implemented as an "application," such as an "app" for a mobile device. After the computer program has been downloaded, the program can be installed on the computing device 304 in an executable format. The executable form of the program permits the user to access embodiments of the present invention via an electronic resource, such as a mobile "app" or website. For the web-accessible computer program, the user may simply access the computer program via the network 306 (e.g., the Internet) with the computing device 304.

Once the user has access to the electronic resource, via the computer program installed on a user's computing device 304 or the web, certain embodiments may provide for users to create accounts with which to access the electronic resource. The user accounts may be stored within the memory elements of the computing device 304, the server 302, or in the associated locksmithing database. Certain embodiments of the present invention may provide for at least two types of accounts: a general user account, hereinafter referred to as a locksmith account; and an administrative user account, hereinafter referred to as an admin account. Each type of user account may provide their respective users with unique roles, capabilities, and permissions with respect to implementing embodiments of the present invention. In addition, embodiments of the present invention may include any number and/or any specific types of account as may be necessary to carry out the functions, features, and/or implementations of the present invention.

A locksmith account is an account created by or for locksmith users who may implement embodiments of the present invention to obtain key codes for locks and use the key codes to manufacture and/or program keys that operate the locks. Although the terms locksmith account and locksmith user account are used herein, it is to be understood that the locksmith account may be used by other users who are not locksmiths. For instance, automotive diagnostic/repair technicians or other authorized persons or entities may require use of the features and functionality of the present. Thus, such persons or entities may obtain a locksmith account and may be considered and referred to as locksmith users. As such, the term locksmith is not intended to be limiting. Instead the term locksmith is directed to any type of individual or entity that requires use of the features and functionality of the present invention as described herein. As will be discussed in more detail below, the locksmith user may make use of various embodiments of the present invention to enter vehicle information, obtain key codes that correspond to the vehicle information, decrypt the key codes to obtain key specification data, and therefrom manufacture and/or program keys.

Each locksmith user with a locksmith account may be required to enter, or have entered, various types of identification information, such as email address, name, telephone number, physical address, date of birth, sex, or the like. In addition, because embodiments of the present invention may be implemented to obtain key codes and therefrom manufacture and program duplicate keys, certain embodiments may require locksmith users to verify their identity and to confirm their status as a licensed locksmith, automotive diagnostic/repair technician, or another authorized user with authorization to obtain key codes and to form duplicate keys. The status may be verified by the locksmith user digitally scanning or capturing a digital image of their license, employee verification, or similar verification document, and uploading the digital image via a computing device 304 to the server 302. Additional embodiments may provide for a locksmith user to verify their status in other ways, such as hand delivery, fax, or regular mail. Once the locksmith user has been verified to be a licensed locksmith, automotive diagnostic/repair technician, or some other authorized user, the locksmith user may be required to enter or will otherwise be provided with a username and password, which may be required for the locksmith user to login to the locksmith user's account and to access the electronic resource. All information entered by the locksmith user is generally received, via the network 306, and may be stored on the server device 302 or associated locksmithing database.

Although certain embodiments of the present invention may require a locksmith user to establish an account, other embodiments may provide for certain features of the present invention to be utilized, such as browsing or testing the electronic resource, without requiring the establishment of a user account. For instance, a potential locksmith user may access the online website and browse and implement certain features of the present invention without needing to register or create an account.

In addition to locksmith users, embodiments of the present invention may provide for an admin account to be established for administrative users. The admin account may be established for administrative users to manage and oversee the locksmith accounts, such that the administrative user can add, delete, modify, enable, or disable such locksmith user accounts. In addition, an admin account may be created for support technicians. Support technicians are experts in the locksmithing and/or automotive maintenance/repair fields. Such support technicians may be provided with an admin account to provide expert locksmithing assistance to locksmith users via embodiments of the present invention, as will be discussed in more detail below. However, it is noted that other admin accounts may be created and/or modified as necessary to carry out the functions, features, and/or implementations of the present invention.

Operation

Embodiments of the present invention provide for locksmith users to obtain key codes, including blind key codes and/or electronic security codes, with which the locksmith user can form a duplicate key for a vehicle's ignition and/or locks. In such embodiments, the locksmith user may use a computing device 304, including a wireless mobile device (e.g., smartphone, tablet, PDA), to obtain the key codes.

To begin, the locksmith user may be required to log-in to the locksmith user's locksmith account via the computing device 304. As previously noted, embodiments of the present invention may be embodied in an electronic resource, such as a website or mobile application. Thus, the locksmith user may access the electronic resource from the computing device 304 either through a web browser application on the computing device or through a mobile app that was previously downloaded and installed onto the computing device.

Once logged-in, the locksmith user can search for a key code that corresponds to a key for a lock and/or ignition for a particular vehicle. To search for a key code, the locksmith user may manually enter into the computing device 304 certain types of vehicle information, such as a make, a model, a year of manufacture, an electronic security identification number (ESIN), or a VIN of vehicle. The VIN is an alphanumeric string of digits that is generated by the vehicle manufacturer upon assembly of the vehicle. Each VIN is uniquely assigned to a particular vehicle, such that no two vehicles have the same VIN. The vehicle information can be manually entered by the locksmith user by typing the vehicle information, via the user interface and/or GUI, or by selecting appropriate vehicle information from a list or pull-down menu displayed on the GUI. In additional embodiments of the present invention, the vehicle information may be provided by the locksmith without logging-in to the locksmith account. For instance, the locksmith user may email the vehicle information to an email address associated with an administrative user or the server 302. Additional embodiments may provide for the locksmith user to text the vehicle information, via SMS text, to a telephone number associated with the administrative user or the server 302. In further embodiments, the locksmith user may provide the vehicle information verbally to an administrative user (or other authorized individual) by contacting the administrative user at a telephone number associated with the administrative user and communicating the vehicle information over a telephone network.

In even further embodiments of the present invention, the locksmith user may enter the vehicle information by obtaining an image of the VIN with a camera or scanner, such as barcode scanner, on the locksmith user's computing device 304. If the locksmith user uses the camera to obtain an image of the VIN, the VIN can thereafter be stored on the memory element of the computing device 304 or uploaded to the locksmithing database via the communication network 306. Embodiments of the present invention may include text recognition software that can recognize and interpret the alphanumeric string of digits of the VIN, such that the alphanumeric string can be stored in the computing device 304 or the locksmithing database. In additional embodiments, certain vehicles display their VIN in the form of a barcode or QR code. Thus, embodiments of the present invention may provide for locksmith users to scan the barcode with a scanner included on the locksmith user's computing device 304. Thereafter, the computing device may convert the information encoded on the barcode into the VIN, such that the VIN can be stored in the computing device 304 or uploaded to the locksmithing database.

Upon receipt of the vehicle information, embodiments of the present invention may attempt to match the vehicle information with a key code contained within the locksmithing database. If the locksmithing database contains a matching key code, embodiments of the present invention can use the key code to manufacture or program a key, as will be discussed in more detail below. If the locksmithing database does not contain a matching key code, embodiments of the present invention allow for an electronic connection to one or more external database, which may be hosted by one or more key code providers. The key code providers may be automotive manufacturers or other third-party providers that facilitate access to key codes. The connection to the key code providers may be implemented from the server 302 or directly from the computing device 304 via the communications network 306. Upon connecting with the one or more key code providers, embodiments of the present invention provide for the external databases to be searched to obtain key codes that match the vehicle information. Thus, embodiments of the present invention may provide for key codes to be obtained by matching vehicle information with key codes stored in the locksmithing database or by matching the vehicle information with key codes store on third-party databases hosted by key code providers. Further, certain embodiments of the present invention may not search for key codes in the locksmithing database, such that only the external databases hosted by key code providers are searched to obtain the key codes.

After the locksmith user obtains key codes from either a key code provider or from the locksmithing database, embodiments of the present invention provide for the locksmith user to decrypt the key codes, if necessary. For instance, for those key codes that are blind key codes, such key codes must be decrypted into bitting key codes or into other unencrypted forms from which mechanical key specifications can be obtained. Embodiments of the present invention may decrypt the blind key codes into bitting key codes by running decryption routines (which may include mathematical algorithms), by using a third-party decryption software (such as may be offered by INSTACODE™), or by matching the blind key codes with cross-referenced bitting key codes stored in the locksmithing database. Such decryption processes may be performed by the server devices 302, or alternatively, by the locksmith user's computing device 304. For instance, the locksmithing database may include a cross-referenced listing of bitting key codes, such that bitting key codes may be obtained from blind key codes without performing mathematical decryption algorithms.

Upon decrypting the key code to obtain the bitting key code, embodiments of the present invention may present the key code and/or bitting key code to the locksmith user via the computing device 304. The key code and/or bitting key code may be displayed to the user on the GUI of the user's computing device 304, via the electronic resource (i.e., mobile app or the website). In additional embodiments, the key code and/or bitting key codes may be transmitted to the locksmith user via an SMS text message, e-mail, telephone call, or other electronic notification/messaging service. Thus, key codes and/or bitting key codes may be transmitted to the locksmith user over a plurality of different types of networks included in the communications network 306. For instance, the key codes and/or bitting key codes may be transmitted to the telephone number associated with the locksmith user's locksmith account via SMS text message. Alternatively, the key codes and/or bitting key codes may be transmitted to the email address associated with the locksmith user's locksmith account. Embodiments of the present invention may provide a selection option, such as an interactive list or pull-down menu, from which the locksmith user can select how the user wishes to receive the presented key codes and/or bitting key codes. As described above, the key code and/or bitting code may also be provided to the locksmith user verbally by a telephone call. For instance, the locksmith user may receive a telephone call at the telephone number associated with the locksmith user's locksmith account, and an administrative user (or other authorized individual) may verbally provide the key code and/or bitting key code to the locksmith user over the telephone network. In even further embodiments, the key code and/or bitting key code may be provided to the locksmith user by an automated telephone call, which includes a pre-recorded or computer generated message indicating the requested key code and/or bitting key code.

Because the bitting key codes include all of the mechanical key specifications necessary to manufacture a key, embodiments of the present invention provide for the bitting key codes and/or the mechanical key specifications to be transmitted to a key forming device 308, such as a key cutting device, that can cut a specified key blank to the appropriate depths, spacings, and angles associated with the transmitted bitting key code and/or mechanical key specifications. As previously noted, because the key code, bitting key code, and/or mechanical key specifications may also include an associated type of key blank, embodiments of the present invention may additionally determine and present to the locksmith user an appropriate key blank to provide to the key cutting device for manufacturing the key. As previously described, the key cutting device may be any key cutting device known in the art, which is used to cut keys from key blanks. For instance, the key cutting device may include milling components that functions to cut grooves, angles, notches, or similar cuts into key blanks according to the requirements of the transmitted mechanical key specifications. The computer program of the present invention may electronically transmit via the communications network the bitting key codes and associated mechanical key specifications to the key cutting machine, and such electronic transmission methods may be hard-wired (i.e., USB, RS-232, etc.) or wireless (i.e., WiFi™, Bluetooth™, etc.). In additional embodiments of the present invention, the locksmith user may manually input the bitting key codes and/or the mechanical key specifications into a user interface of the key cutting device after receiving the bitting key codes and/or mechanical key specifications via embodiments of the present invention. Thereafter, the key cutting device can manufacture a key according to the requirements of the bitting key code and/or the mechanical key specifications.

Embodiments of the present invention additionally provide for the locksmith user to enter a plurality of bitting key codes and/or mechanical key specifications into a holding queue that may be established via the electronic resource. The holding queue permits the locksmith user to arrange multiple bitting key codes and/or mechanical key specifications in a list-like order, such that the bitting key codes and/or mechanical key specifications can be consecutively sent to a key cutting device to manufacture the keys in a linear fashion. The holding queue may be created by the locksmith user on the computing device 304, and thereafter, the information pertaining to the queue may be sent to the key forming device 308 via the communications network 306. For instance, if a locksmith user has obtained five bitting key codes and/or five associated mechanical key specifications, the locksmith user can prioritize the bitting key codes and/or mechanical key specifications in the holding queue. After a first bitting key code and/or mechanical key specification is sent to a key cutting machine and the machine manufactures a first key, a second bitting key code and/or mechanical key specification can automatically be sent to the machine to manufacture a second key. Such a linear progression transmission and key manufacture will continue until all of the bitting key codes and/or mechanical key specifications have been transmitted to the key cutting device and each of the associated keys has been manufactured.

As previously noted, to operate locks and ignitions on current vehicles, most keys include electronic identification devices that are required to be programed with electronic security codes. Embodiments of the present invention provide for locksmith users to obtain such electronic security codes similar to how the blind key codes were obtained above. For instance, the electronic security codes may be obtained by the locksmith user by initially inputting vehicle information into the electronic resource via the computing device 304. The vehicle information may additionally be input by text, email, or telephone call, as previously described. Such vehicle information may include a make, a model, a year of manufacture, or a VIN of the vehicle. However, in many instances the electronic security codes may be associated with electronic components of the vehicle, such as the vehicle's BCM or ECU. Thus, to obtain the electronic security codes, the locksmith user may be required to enter the ESINs associated with such electronic components. Such ESINs are similar to VINs in that they are generally alphanumeric strings. But unlike VINs the ESINs correspond to the electrical components of a vehicle as opposed to corresponding directly with the vehicle.

The remaining steps for obtaining the electronic security codes are similar to obtaining the blind key codes as described above. After the locksmith enters the vehicle information, such as make, model, year of manufacture, and other required information (such as VIN or ESIN), embodiments of the present invention search for a corresponding electrical security code that is either maintained in the locksmithing database or that may be maintained at a third-party database hosted by a key code provider. After obtaining an electronic security code, the electronic security code is presented to the locksmith user similar to how the blind key code was presented above. For instance the electronic security code may be presented via the electronic resource or by text message, email, or telephone call, as previously described. Unlike the blind key code, however, the electronic security code may not require decrypting. Thus, an algorithmic decryption process may not be required. After obtaining and being presented with the electronic security code, embodiments of the present invention provide for the locksmith user to transmit the electronic security code to a key forming device 308, such as key programming device, which is capable of programming the electronic identification device within the key with the appropriate electronic security code that matches the electronic module of the vehicle.

Thus, embodiments of the present invention permit a locksmith user to use vehicle information to determine and obtain key codes, such as blind key codes and electronic security codes, from which the locksmith user can manufacture and program a key capable of accessing and operating locks included in a wide array of devices, such as vehicles, machines, equipment, doors, entryways, or the like. The locksmith user can obtain the key code "on-site" at the locked vehicle.

Security Features

As previously noted, because of the security implications of locksmithing, locksmith users may be required to be licensed or otherwise receive special authorization to implement certain embodiments of the present invention. In addition, embodiments of the present invention provide for the implementation of heightened security measures. For instance, embodiments of the present invention may provide for a job history function that operates to save and store each function performed by a locksmith user. For instance, the job history may track and store each of the key codes entered or searched for by the locksmith user. In addition, the job history may include each of the blind key codes, electronic security codes, and/or mechanical key specifications sent to a key forming device for manufacture or programming of a key. Such monitoring may be tracked on a per locksmith user basis. In even further embodiments, the job history may include a physical location of the locksmith at the time the key codes were searched for or when a key was manufactured or programmed. Embodiments of the present invention may determine location information based on global positioning system (GPS) data obtained from of the locksmith user's computing device 304. The location information may also be obtained by other means, such as through Internet Protocol (IP) tracking. For instance, at the time the vehicle information were entered by the locksmith user, either manually or by capturing a digital image of the vehicle information, embodiments of the present invention may capture the GPS location information through the locksmith user's computing device 304 and tag such location information to the job history. The job history may be stored on the locksmith user's computing device 304, or alternatively, the job history may be exported to the server 302 to be saved on the locksmithing database for future reference. In addition to security purposes, the location information may be used for billing, accounting, locksmith user verification, location verification, or other similar purposes.

In addition to associating a locksmith user's location with the job history, a job identification number can be generated and associated with each function performed by a locksmith user. For instance, the job history may include a unique job identification number for each key code that was searched for by a particular locksmith user. Similarly, a job identification number be generated and associated with each key code that was sent to key forming device to manufacture or program a key. The job identification number may be associated with the job history and stored in the locksmith user's computing device 304 or may be transmitted to the locksmithing database for storage. Additionally, the job identification number may be used for billing and accounting requirements. Thus, embodiments of the present invention provide for the storage of job history information, such as location information and job identification numbers, which can be used to track and monitor each of functions performed by the locksmith user.

Additional Features

In addition to the features described above, embodiments of the present invention provide additional features for locksmith users. For instance, embodiments of the present invention may include a locksmithing instruction manual that provides tips and advice on performing certain locksmithing tasks. The instruction manual may be displayed as text, graphic, video, and/or audio information presented via the user's computing device 304. For instance, the locksmithing instruction manual may provide information, tips, or advice on how to manufacture and program keys for a particular vehicle or for a particular lock. The locksmithing instruction manual may also include information specific to a particular vehicle that may be helpful in manufacturing and programming a key for the particular vehicle. For instance, the information may include where the VIN or ESIN may be found or printed on a particular vehicle. The information may additionally include instructions on how to disassemble a lock or gain access to particular compartments within a particular vehicle, such that the locksmith user can obtain vehicle information or make repairs.

The locksmith user may choose a particular locksmithing instruction manual by selecting the appropriate make, model, and year of manufacture of a vehicle. Such a selection may be made by manually entering the vehicle information into the GUI of the user's computing device 304 or by selecting the vehicle information from a list, pull-down menu, or the like. After the vehicle information has been selected, the selected locksmithing instruction manual may be presented to the locksmith user via the GUI of the locksmith user's computing device 304. As an example, after a locksmith user has selected a particular vehicle, embodiments of the present invention may display a video on the locksmith user's computing device 304 that demonstrates (via video and/or audio) how to access an engine compartment of a vehicle; how to find an ESIN on the BCM of the vehicle; and how to program a key with the electronic key code obtained from the ESIN via embodiments of the present invention. In even further embodiments, the locksmith user may transmit the information included in the locksmithing instruction manual to another computing device via text messaging, email, fax, or the like. Similarly, the locksmith user may print the locksmithing instruction manual on a printer connected to the locksmith user's computing device 304.

In addition to the locksmithing instruction manual, embodiments of the present invention may provide for locksmith users to obtain additional instructions, tips, and advice by communicating with other locksmith users or support technicians. The communications may be transmitted over the communications networks 306 via the computing device 304, and may include text messaging, email, voice communications, and/or video communications. As previously described, support technicians are experts in the fields of locksmithing and/or automotive maintenance/repair. The support technicians may be given access to an admin account for purposes of communicating with locksmith users that may require specialized assistance in implementing embodiments of the present invention or in performing a locksmith-related task. For instance, if a locksmith user is having trouble manufacturing a proper cut on a key via a key forming device 308, the locksmith user may contact a support technician via the locksmith user's computing device 304 to obtain assistance. Certain embodiments may provide for a listing of those support technicians that are available to take part in communications. For instance, the locksmith user may select a support technician via a list of support technician displayed on the locksmith user's computing device 304. Upon selecting the support technician, a communications link is established with the support technician over the communications network 306.

Embodiments of the present invention further provide a social media component to facilitate communication and networking between locksmith users, administrative users, and support technicians. Via the social networking component, locksmith users can interact through social media functions contained within embodiments of the present invention, such as interactive forums, RSS feeds, blogs, email, and information search functions. The social media component may permit locksmith users to participate in the exchange of information related to locksmithing, automotive diagnostics/ repair, or associated communities. The social media component may further provide for locksmith users to build social media profiles that include information visible to other locksmith users. For instance, the social media profiles may include information such as the locksmith user's business name, employer name, geographic location, area of expertise, years of experience, or the like. In addition, embodiments of the present invention may provide for locksmith user's to rate or rank other locksmith users, such that each locksmith user's rating or ranking is visible for other users to view. For instance, if the locksmith user has provided valuable or insightful information in the past, other users may rate the locksmith user with a high rating to indicate to other users that information provided or posted by said locksmith user may be particularly useful. Further, the social media component of the present invention may present targeted activities to locksmith users based on the locksmith users' profile, such activities may email distributions for locksmithing related announcements, targeted advertisements, or the like.

Embodiments of the present invention may also provide for advertisements to be displayed to locksmith users via the GUI of the locksmith user's computing device 304. The advertisements may be directed to locksmithing products, services, or companies. In addition, such advertisements may include non-locksmithing related promotions. The advertisements may be displayed on the computing device 304 of the locksmith user as a banner advertisement, full-page advertisement, or the like. As briefly described above, the advertisements may be targeted at particular locksmith users based on the locksmith users' profile. For instance, if a locksmith user's profile indicates that the user is a locksmith based out of Kansas City, Mo., embodiments of the present invention may provide for the display of targeted advertisements from locksmith support companies, such as key forming device manufacturers/sellers, which offer products to locksmiths in the Kansas City, Mo., area.

In addition, embodiments of the present invention may provide for locksmith users to select and purchase key blanks from key blank providers. As previously described, each key code may include information regarding a particular key blank from which a key should be cut. Thus, after a key code is decrypted and a particular type of key blank is identified, embodiments of the present invention provide for a locksmith user to order and purchase the key blank from a key blank provider. Embodiments of the present invention may provide for a list of key blank providers and/or a list of key blanks from which to choose for purchasing. In certain embodiments, the electronic resource may include a "shopping cart" feature in which key blanks identified for purchase by the locksmith user are identified and stored. Once the locksmith user has selected all of the key blanks for purchase, the locksmith user may purchase the unique via the electronic resource with a credit card, debit card, gift card, coupon, or the like. The locksmith user may additionally enter shipping information such that upon purchasing the key blanks, the key blanks can be shipped to the listed address. In addition, if the locksmith user uses particular types of key blanks often, the locksmith user can order such key blanks from key blank providers in bulk. Thus, embodiments of the present invention provide for the locksmith user to enter or select the types of key blanks to order directly via the locksmith user's computing device 304. Thereafter, embodiments of the present invention place the locksmith user's order over the communications network 306 directly to the key blank provider.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for obtaining and distributing key codes, the system comprising:
  a key forming device; and
  a computer having:
    a user interface for input of lock information; and
    a non-transitory computer-readable storage medium with an executable program stored thereon, wherein the program instructs the processor to perform the following steps:
      receive, via the user interface, the lock information from the locksmith user;
      connect to a key code provider;
      obtain a key code from the key code provider, wherein the key code corresponds to the lock information received from the locksmith user;
      decrypt the key code obtained from the key code provider to obtain key specification data;
      present to the user the key code or the key specification data; and
      form a key, via the key forming device using the key specification data,
    the program including a social networking component for communicating and networking between the computer and computers of other users via a wireless communication network, the social networking component including:
      a social media profile builder for creating a locksmith user profile having locksmith user information including the user's business name, employer name, geographic location, area of expertise, and years of experience, the profile being visible to other users over the wireless communication network;
      a locksmith user rating section for allowing other users to rate the locksmith user according to locksmithing information provided by the locksmith user and for publishing the locksmith user's rating on the locksmith user's profile such that other users may view the locksmith user's ratings over the wireless communication network; and
      an online key blank ordering interface for allowing the locksmith user to purchase key blanks from a selected key blank provider over the wireless communication network;
    the program being configured to:
      provide access to interactive forums for exchanging locksmithing information over the wireless communication network;
      provide access to an email component for directly communicating with other users over the wireless communication network;
      select targeted advertisements based on a geographic location of the locksmith user and information in the locksmith users profile; and
      display the targeted advertisements via the user interface.

* * * * *